C. SCHNEIDER.
PARCEL HANDLE.
APPLICATION FILED FEB. 26, 1918.
1,300,030.
Patented Apr. 8, 1919.
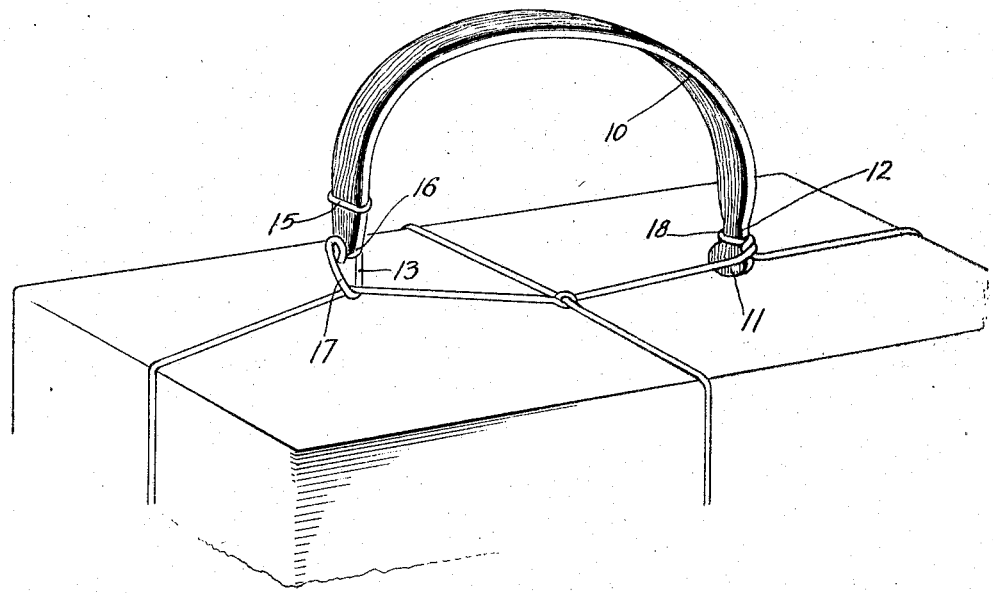
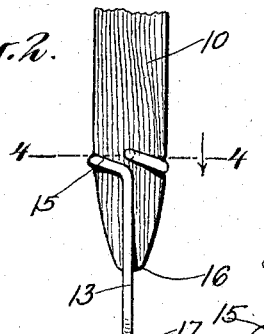
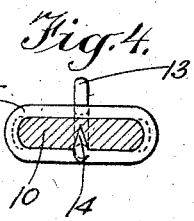
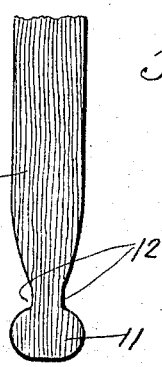
WITNESSES
INVENTOR
Conrad Schneider
BY
ATTORNEYS

UNITED STATES PATENT OFFICE.

CONRAD SCHNEIDER, OF NEW YORK, N. Y.

PARCEL-HANDLE.

1,300,030.  Specification of Letters Patent.  Patented Apr. 8, 1919.

Application filed February 26, 1918. Serial No. 219,218.

*To all whom it may concern:*

Be it known that I, CONRAD SCHNEIDER, a citizen of the United States, and a resident of the city of New York, borough of Manhattan, in the county and State of New York, have invented a new and Improved Parcel-Handle, of which the following is a full, clear, and exact description.

This invention relates to detachable parcel handles such as are commonly used for handling or carrying packages, bundles, boxes or the like wrapped with cord, or its equivalent.

The primary object of the invention is to provide a strong, comfortable and reliable handle at a minimum cost.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a perspective view illustrating one manner of use of my improvement.

Fig. 2 is an inside elevation of the hook end of the device.

Fig. 3 is an end elevation of the head end of the handle; and

Fig. 4 is a cross sectional detail on the line 4—4 of Fig. 2.

Referring now more particularly to the drawings I show my improvement as comprising a bow-shaped handle 10 made preferably of a single piece of flat wood suitably bent into permanent bow-shape, the grain of the wood extending lengthwise throughout the bow and hence affording maximum tensile strength. The handle is made without holes or openings in any direction and thereby the cost of manufacture thereof is kept at a minimum.

At one end is formed a head 11 as by reducing or notching the side edges of the body adjacent thereto as indicated at 12. At the other end is attached or formed in any suitable manner a hook 13 shown in this case as comprising a short bit of wire. This wire hook may be attached in any suitable manner as for instance by having a point 14 thereof forced into the inner face of the handle, the wire being thence bent into a loop 15 directly around the handle with sufficient force to bite or embed itself somewhat into the edges of the handle, and thence the wire is bent downward past the end or point 16 of the handle and then bent upon itself forming the hook proper 17. This hook may be of any desired shape or with its point extending in any suitable direction, but I preferably so construct it that the bend or loop of the hook lies directly in the vertical longitudinal central plane of the entire handle whereby the cord when engaged in the bend of the hook will be slightly deflected and the liability of the handle to become detached from the parcel will be reduced to a minimum.

The manner of applying and using the handle will be apparent from the illustration. The head 11 is first slipped beneath the cord and the handle is then given a twist sufficient to engage a loop 18 of the cord around the notched portion just above the head 11, and then the hook 17 is slipped beneath the cord on the opposite side of the center of the package. A handle made in accordance with this disclosure is as strong and is cheaper than handles now on the market, and is fully as reliable.

I claim:

1. As an article of manufacture, a parcel handle comprising a bent piece of wood the grain of which runs lengthwise from end to end and having a head formed as an integral part of one end, and a metal hook secured to the other end.

2. As an article of manufacture, a parcel handle of a relatively rigid bow-shaped piece of wood, the grain of which extends lengthwise throughout the bow, the bow having formed on one end an integral head, and a metallic hook gripped around the opposite end of the bow from the head, substantially as set forth.

CONRAD SCHNEIDER.

Copies of this patent may be obtained for five cents each, by addressing the "Commissioner of Patents, Washington, D. C."